United States Patent
Kiely

(10) Patent No.: US 6,765,143 B2
(45) Date of Patent: Jul. 20, 2004

(54) TUBING AND CONDUIT COUPLING OR CONNECTOR ASSEMBLY

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 10/183,325

(22) Filed: Jun. 26, 2002

(65) Prior Publication Data

US 2003/0116336 A1 Jun. 26, 2003

Related U.S. Application Data

(60) Provisional application No. 60/303,598, filed on Jul. 9, 2001.

(51) Int. Cl.[7] ............................ H02G 15/24; F16L 39/00
(52) U.S. Cl. ................. 174/21 R; 174/84 R; 174/88 R; 285/127
(58) Field of Search .............................. 174/84 R, 88 R, 174/89, 69, 70 R, 70 C, 72 R, 21 R

(56) References Cited

U.S. PATENT DOCUMENTS

| | | | |
|---|---|---|---|
| 3,984,130 A | | 10/1976 | Berger et al. |
| 3,995,897 A | * | 12/1976 | Paskert ....................... 285/340 |
| 4,005,879 A | | 2/1977 | Berger et al. |
| 4,047,743 A | | 9/1977 | Weintraub et al. |
| 4,050,722 A | | 9/1977 | Berger et al. |
| 4,073,514 A | * | 2/1978 | Pate ........................ 285/149.1 |
| 4,082,319 A | | 4/1978 | Berger et al. |
| 4,146,252 A | | 3/1979 | Buda |
| 4,368,997 A | | 1/1983 | Shemtov |
| 4,435,005 A | | 3/1984 | Berger et al. |
| 4,810,009 A | * | 3/1989 | Legris .......................... 285/39 |
| 5,366,260 A | * | 11/1994 | Wartluft ...................... 285/323 |
| 5,422,437 A | | 6/1995 | Schnell |
| 5,487,572 A | * | 1/1996 | Combot-Courrau et al. ........................... 285/308 |
| 5,527,073 A | * | 6/1996 | Readman ..................... 285/340 |
| 5,603,530 A | * | 2/1997 | Guest .......................... 285/105 |
| 5,681,062 A | * | 10/1997 | Fukao et al. ................. 285/340 |
| 5,695,224 A | * | 12/1997 | Grenier ....................... 285/104 |
| 5,816,627 A | * | 10/1998 | Readman ..................... 285/340 |
| 6,043,432 A | | 3/2000 | Gretz |
| 6,080,933 A | | 6/2000 | Gretz |
| 6,231,090 B1 | * | 5/2001 | Fukao et al. ................. 285/340 |
| 6,357,802 B1 | * | 3/2002 | Nozato et al. ............... 285/340 |
| 6,464,266 B1 | * | 10/2002 | O'Neill et al. .............. 285/340 |

* cited by examiner

Primary Examiner—William H. Mayo
(74) Attorney, Agent, or Firm—Melvin I. Stoltz

(57) ABSTRACT

By providing a single, elongated, hollow, cylindrically shaped housing member and locking rings or washers mounted at the ends of the housing member, a simple, easily used, inexpensive conduit coupling and connector assembly is achieved. In one embodiment, the connector assembly is constructed for receiving the free ends of two separate and independent conduits and securely affixing the two conduits in co-axial, aligned, cooperating relationship with each other, while in an alternate embodiment, a single conduit or tubing member is securely mounted to the connector assembly for positioning the conduit or tubing member in a precisely desired location. In addition, the conduit coupling and connector assembly of the present invention may be implemented using various alternate embodiments for either the locking rings or washers or for the housing member.

14 Claims, 5 Drawing Sheets

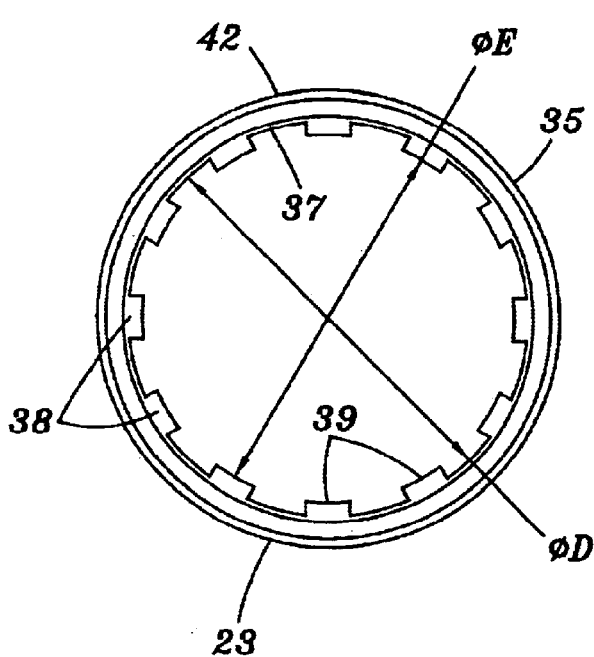
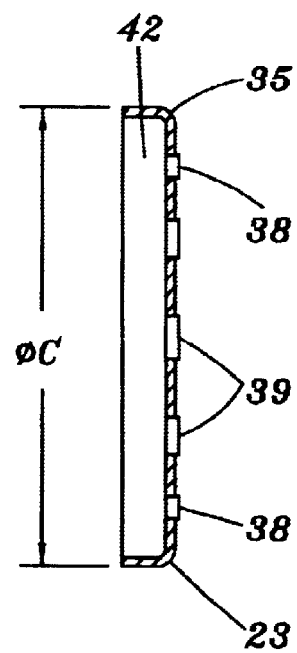
FIG. 6    FIG. 7
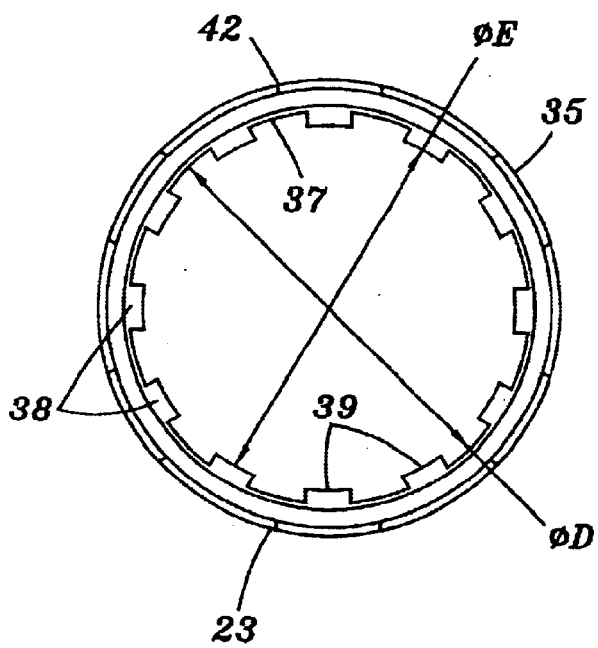
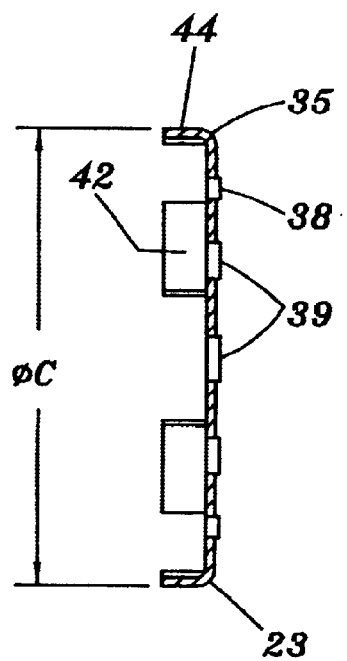
FIG. 8    FIG. 9

TUBING AND CONDUIT COUPLING OR CONNECTOR ASSEMBLY

RELATED APPLICATIONS

This application is related to U.S. Provisional Patent Application Serial No. 60/303,598, filed Jul. 9, 2001 entitled TUBING AND CONDUIT COUPLING OR CONNECTOR ASSEMBLY.

TECHNICAL FIELD

This invention relates to conduit coupling and connector assemblies and, more particularly, to such assemblies constructed for securing one independent conduit or tubing member to a particular location or for securing the two independent conduits or tubing members to each other in cooperating association.

BACKGROUND ART

In constructing or renovating residential or commercial buildings, increasing effort is required in properly distributing wiring and cables throughout the building. In this regard, numerous instances occur wherein conduits must be interconnected to each other in order to carry the wire or cable therein. Although the conduit could be threaded, with a connecting nut or sleeve mounted to both ends for securing the conduits to each other, such a construction is time consuming and labor intensive. As a result, a quick, easily employed EMT tubing or rigid conduit coupling or connector has long been sought in the industry.

Although numerous prior attempts have been made for providing a coupling/connector of this nature, wherein threaded engagement is eliminated, such prior art constructions have been unable to satisfy the industry need. Typically, these prior art constructions all suffer from the common problems of high cost, inability to provide reliable interconnections, and difficulty of assembly. Consequently, although prior art couplings and connectors exist in this field, prior art systems have not been widely used due to their inherent expense and difficulties.

In addition, many of these prior art products are difficult to employ, requiring the users to exercise extreme care in effectively engaging and securing a desired conduit or tubing member to the connector assembly. As a result, these prior art systems have been unable to satisfy the needs existing in the industry.

Therefore, it is a principal object of the present invention to provide a conduit coupling and connector assembly which is easily employed by the user in a simple, straightforward manner.

Another object of the present invention is to provide a conduit coupling and connector assembly having the characteristic features described above which allows any desired conduit or tubing member to be quickly and easily telescopically inserted into the conduit coupling and connector assembly while also providing secure, locking engagement thereof.

Another object of the present invention is to provide a conduit coupling and connector assembly having the characteristic features described above which is capable of being produced inexpensively, thereby achieving a product which is low in cost and highly effective.

Other and more specific objects will in part be obvious and will in part appear hereinafter.

SUMMARY OF THE INVENTION

By employing the present invention, all of the difficulties and drawbacks found in the prior art have been eliminated and a simple, easily use, inexpensive conduit coupling and connector assembly is achieved. In the present invention, the conduit coupling and connector assembly comprises a single, elongated, hollow, cylindrically shaped housing member and locking rings or washers mounted at the ends of the housing member.

In one embodiment, the connector assembly is constructed for receiving the free ends of two separate and independent conduits and securely affixing the two conduits in co-axial, aligned, cooperating relationship with each other. In an alternate embodiment, a single conduit or tubing member is securely mounted to the connector assembly for positioning the conduit or tubing member in a precisely desired location.

By employing the simple, easily manufactured conduit coupling or connector assembly of the present invention, with its cooperating housing member and locking washers or rings, a quickly and easily achieved, secure engagement of one or two conduits or tubing members in a precisely desired location is attained. Furthermore, the assembly is realized by merely telescopically inserting the conduit or tubing member into the coupling after assembly, where the conduit or tubing member is securely engaged in a position which prevents axial removal of the conduit or tubing member therefrom. As a result, the desired permanent interengagement and cooperating relationship of these components is realized.

In addition, the conduit coupling and connector assembly of the present invention may be implemented using various alternate embodiments for either the locking rings or washer or for the housing member. However, regardless of the alternate embodiment employed, the housing member of the conduit coupling and connector assembly of the present invention typically incorporates a first, hollow, cylindrically shaped conduit receiving section and at least one, enlarged, annular flange portion formed, at least, at one end of the conduit receiving section. In the embodiment constructed for securing the two separate and independent conduit or tubing members to the connector assembly, the receiving section is constructed with a sufficient length for enabling two conduits to be inserted therein, and the terminating end of each section incorporates an enlarged annular flange portion.

The second component incorporated into the conduit coupling and connector assembly of the present invention is the locking ring or washer. In this regard, several alternate constructions can be employed for the locking ring/washer. In one embodiment, a flat, thin, locking ring or washer is employed which is securely and immovably engaged with the inside surface of the flange portion by the frictional forces provided by the frictional contact between the outer diameter of the ring/washer and the surface defined by the inner diameter of the flange portion. If desired, staking of the locking ring/washer in the desired position can be employed.

In order to assure that the conduit or tubing member is securely engaged with the coupling and connector assembly of the present invention, when inserted in the conduit receiving section of the housing, the locking ring/washer incorporates a plurality of fins radially extending inwardly from the inside diameter thereof. In addition, the radially extending fins are positioned in cooperating association for providing the desired locked engagement with the outer surface of the conduit or tubing member when inserted therewith. In this way, a quickly and easily assembled and manufactured construction is realized which has been found to be extremely effective and efficient in achieving the desired goals.

In an alternate embodiment, the locking ring/washer may incorporate a flat, thin, flange member for peripherally surrounding the outer edge of the locking ring/washer. In this construction, an enlarged surface area is provided for frictionally engaging the flange portion of the housing member. Furthermore, in a further alternate embodiment, a locking finger may be formed in the flange member for further engaging the inside surface of the flange portion.

In a still further alternate embodiment, the housing member is constructed with a plurality of slots formed in the flange portion, peripherally surrounding the flange portion in juxtaposed spaced, relationship to each other. In addition, the locking ring/washer is constructed with a plurality of tabs radially extending outwardly, with each tab being positioned and constructed for mating engagement in a slot formed in the flange of the housing member. In this way, secure locked engagement of the locking ring/washer is realized.

In a further construction of this embodiment of the present invention, the locking ring/washer may be formed with a substantially flat circular shaped plate which incorporates the outwardly extending tabs formed on the outer surface thereof and inwardly extending tabs formed on the inside surface thereof, for providing the desired locked engagement with the conduit or tubing member inserted therein. Regardless of which embodiment of this construction is desired, assurance is provided that any conduit or tubing member inserted therein is securely engaged and maintained in locked interconnection with the housing member of the conduit coupling and connector assembly.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the present invention, reference should be had to the following detailed description, taken in connection with the accompanying drawings, in which:

FIG. 4 is a side elevation view of the locking ring or washer forming the second component of the coupling assembly of the present invention;

FIG. 5 is a cross-sectional end view of the locking washer of FIG. 4;

FIG. 6 is a side elevation view of an alternate embodiment for the locking ring/washer employed in the coupling assembly of the present invention;

FIG. 7 is a cross-sectional end view of the locking ring/washer of FIG. 6;

FIG. 8 is a side elevation view of a further alternate embodiment of locking ring/washer forming a component of the coupling assembly of the present invention;

FIG. 9 is a cross-sectional end view of the locking ring/washer of FIG. 8;

FIG. 12 is a side elevation view of a still further alternate embodiment of the locking ring/washer forming a component of the coupling assembly of the present invention;

FIG. 13 is an end view of the locking ring/washer of FIG. 12;

DETAILED DISCLOSURE

By referring to FIGS. 1–15, along with the following detailed disclosure, the construction and operation of various alternate embodiments of the present invention will be fully understood. The alternate embodiments detailed herein merely represent preferred constructions, which may be further changed without departing from the scope of the present invention. Consequently, this disclosure should be interpreted as illustrative, and not in a limiting sense.

Figure 1:
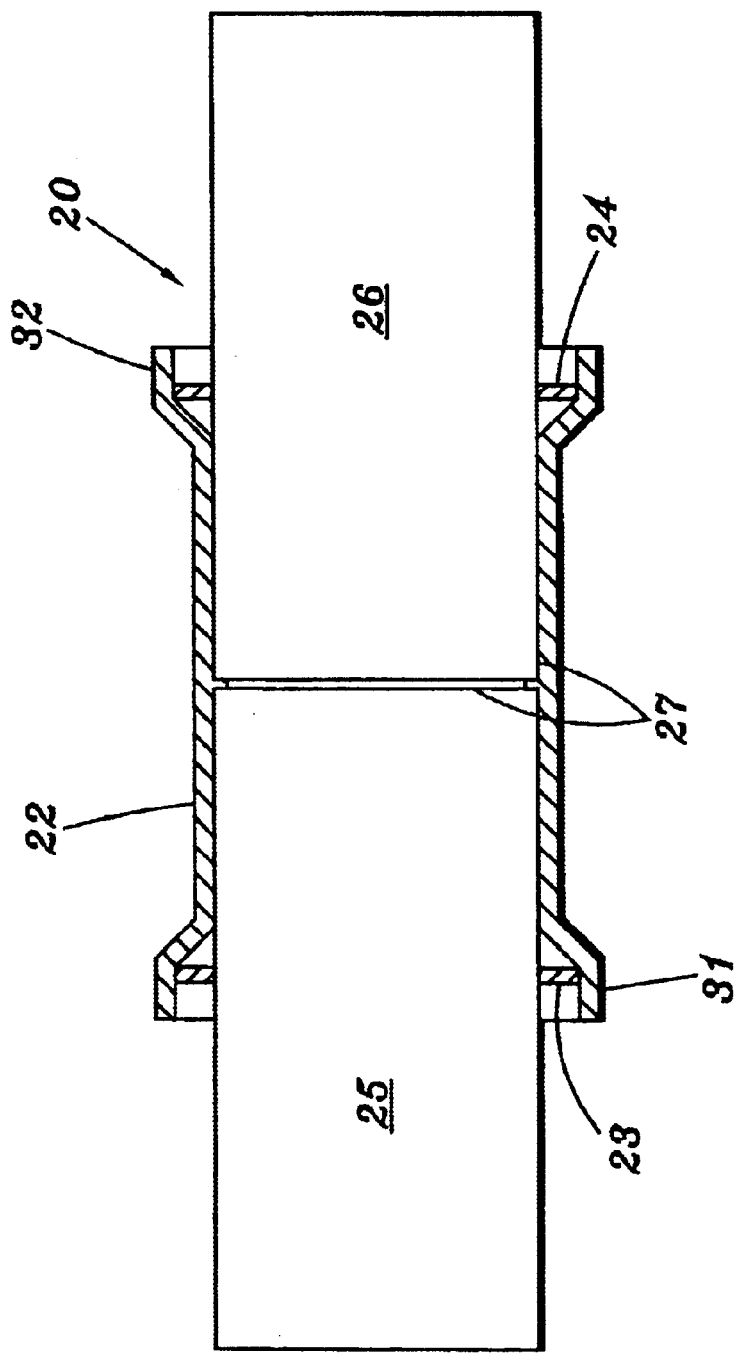
FIG. 1 is a cross-sectional side elevation view of the tubing or conduit coupling assembly of the present invention shown engaged with two tubings or conduits.

In FIGS. 1–5, the preferred construction of the present invention is fully disclosed. In this embodiment, conduit or tubing coupling assembly 20 comprises a conduit or tubing coupling member 22 and a pair of flat locking rings or washers 23 and 24. In FIG. 1, conduit/tubing coupling assembly 20 is shown in a fully assembled configuration, securely locking and holding conduits or tubing 25 and 26 in juxtaposed, spaced, relationship.

Figure 3:
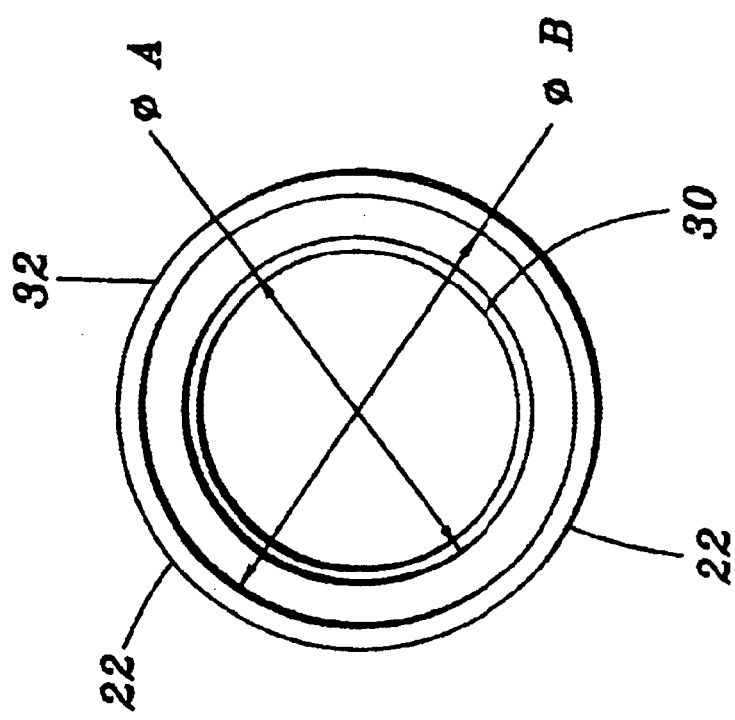
FIG. 3 is an end view of the coupling member of FIG. 2.
Figure 2:
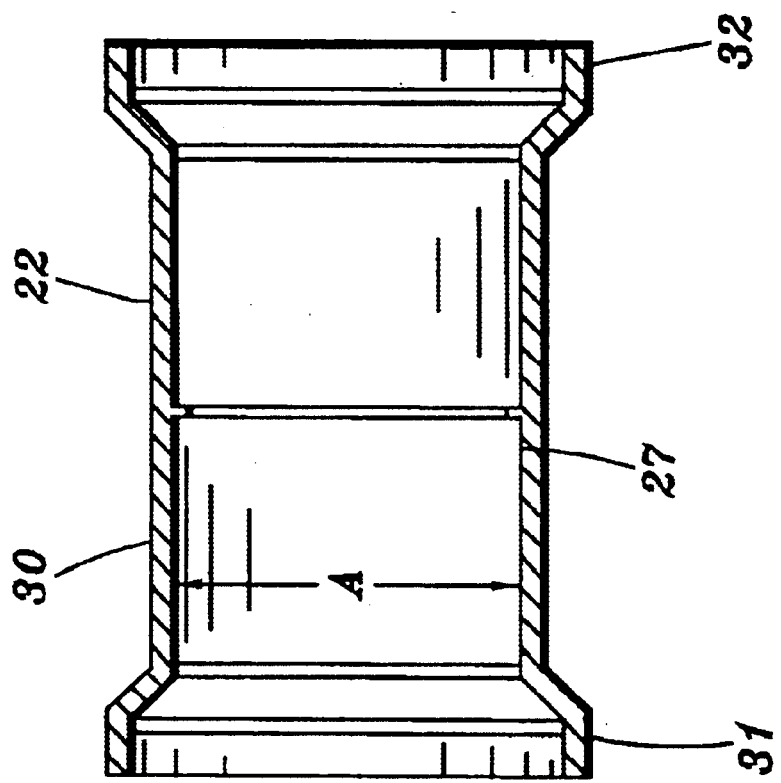
FIG. 2 is a side elevation view of the coupling member forming one component of the coupling assembly of the present invention.
Figure 11:
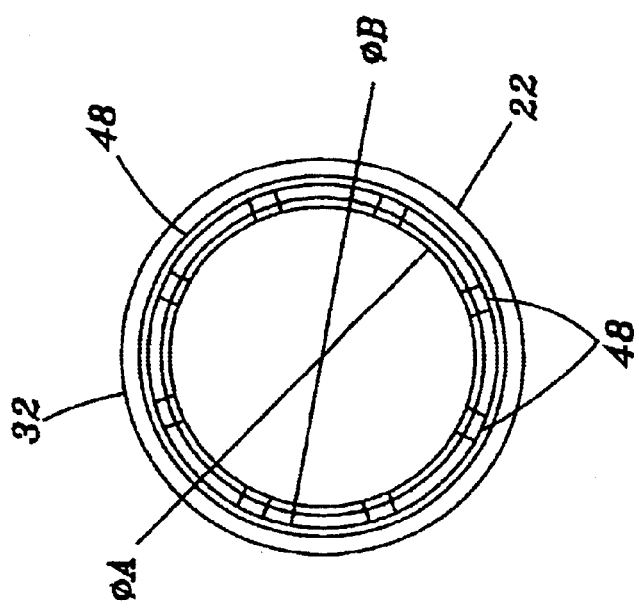
FIG. 11 is an end view of the coupling member of FIG. 10.
Figure 10:
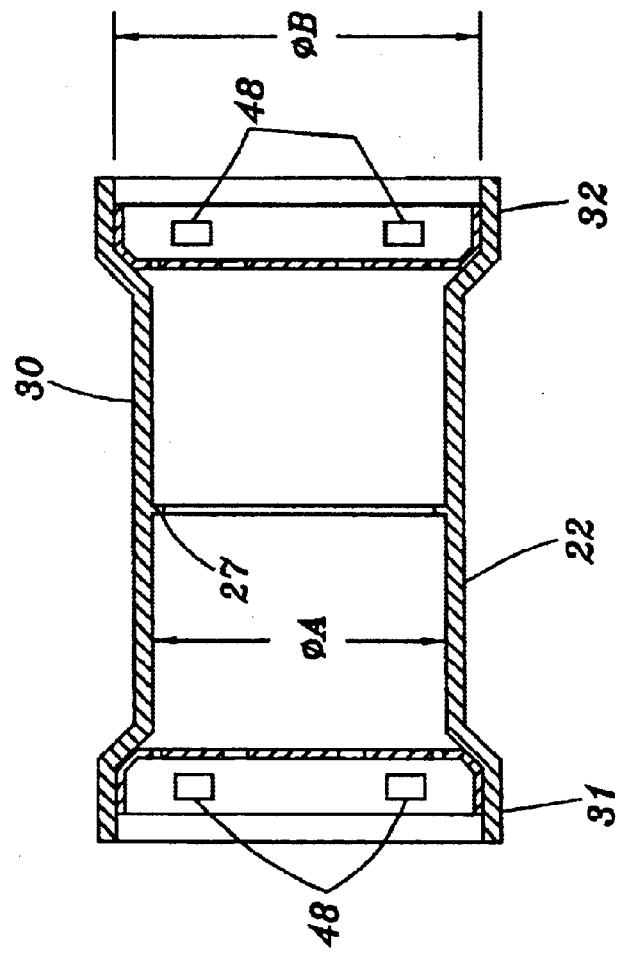
FIG. 10 is a cross-sectional side elevation view of an alternate embodiment for the coupling member forming one of the components of the coupling assembly of the present invention.

In FIGS. 2 and 3, the preferred embodiment of conduit/tubing coupling member 22 is shown. As depicted, conduit/tubing coupling member 22 comprises a generally hollow, cylindrically shaped central section 30, which incorporates inside diameter "A" extending substantially the entire length of central section 30.

In addition, central section 30 incorporates upstanding ridge 27 formed substantially mid-way along the length of central section 30. Ridge 27 is employed as an abutment stop for conduits 25 and 26 as they are advanced into coupling member 22.

Furthermore, conduit/tubing coupling member 22 comprises enlarged, terminating annular zones 31 and 32 forming the opposed ends of coupling member 22. In the preferred construction, annular zones 31 and 32 each comprise internal diameter "B", which is a greater than internal diameter "A".

In FIGS. 4 and 5, the preferred construction of flat, locking rings or washers 23 and 24 are fully depicted. Since both locking rings/washers 23 and 24 comprise identical constructions, FIGS. 4 and 5 depict only ring/washer 23, for exemplary purposes, with the intent that FIGS. 4 and 5 detail the construction of both rings/washers 23 and 24.

As shown in its preferred embodiment, ring/washer 23 comprises a flat, planar, circular shaped annular rim member 35, which is defined by outer edge 36 and inner edge 37. In addition, rim member 35 comprises an outer diameter "C", corresponding to the diameter of outer edge 36, and inner diameter "D", corresponding to the diameter of inner edge 37.

In this preferred embodiment, outer diameter "C" of ring/washer 23 is constructed to be slightly greater than inner diameter "B" of annular zones 31 and 32. In this way, rings/washers 23 and 24 are capable of being mounted in annular zones 31 and 32 in mating, locked, frictional engagement therein. As a result of this construction, once rings/washers 23 and 24 are fully inserted into annular zones 31 and 32, as shown in FIG. 1, locking rings/washers 23 and 24 are incapable of being removed therefrom without destruction of the locking rings/washers.

In the preferred construction of this embodiment, locking ring/washer 23 is completed by incorporating a plurality of radially extending tabs 38, each of which extend inwardly from inner edge 37 of rim member 35. In the preferred construction, as depicted in FIGS. 4 and 5, radially extending tabs 38 are preferably spaced about inner edge 37, substantially equidistant from each other, with each tab 38 being diametrically opposed from another tab 38. In addition, each radially extending tab 38 incorporates a terminating edge 39, and diametrically opposed edges 39—39 of each pair of facing tabs 38 define diameter "E".

In the preferred construction, diameter "D" of ring/washer 23 is constructed to be greater than the outer diameter of tubing/conduits 25 and 26 with which ring/washer 23 is to cooperate. In this way, tubing/conduits 25 and 26 are able to freely pass through diameter "D" of ring/washer 23 without incurring any interference. However, diameter "E", which is established by edges 39 of facing tabs 38, is constructed to be less than the outside diameter of tubing/conduits 25 and 26. In this way, once tubing/conduits 25 and 26 have passed through ring/washer 23, radially extending tabs 38 frictionally engage the outer surface of tubing/conduits 25 and 26, preventing their removal or withdrawal therefrom.

In the preferred embodiment, the length of each tab 38 is constructed to enable tubing/conduits 25 and 26 to be forced through rings/washers 23 and 24, overcoming the interference fit created by diameter "E" of tabs 38. However, although tubing/conduits 25 and 26 can be forced through rings/washers 23 and 24, once fully engaged therein, as shown in FIG. 1, removal of tubing/conduits 25 and 26 is incapable of being achieved. The secure engagement of tubing/conduits 25 and 26 in coupling member 22 is due to secure frictional engagement between tabs 38 of rings/washers 23 and 24 with tubing/conduits 25 and 26, as well as the secure frictional engagement of rings/washers 23 and 24 with annular zones 31 and 32 of coupling member 22.

As discussed above, in the construction field, numerous wires must be distributed throughout a building, whether the building is for commercial or residential purposes. In order to enable the wires to be protected by tubing/conduits 25 and 26, while also enabling quick, aligned engagement of tubing/conduits 25 and 26 with each other, coupling member 22 is employed in combination with locking rings/washers 23 and 24.

Using the construction detailed above, tubing/conduit 25 is forced into annular zones 31 of coupling member 22 in a manner which causes tubing/conduit 25 to pass through locking ring 23 until fully engaged within coupling member 22, abutting with upstanding ridge 27. Then, tubing/conduit 26 is forced through annular zones 32 of coupling member 22 in a manner to cause tubing/conduit 26 to pass through ring/washer 24 thereof until fully seated and engaged with ring/washer 24, with its end abutting ridge 27. Once completed, tubing/conduits 25 and 26 are securely mounted in cooperating relationship with each other, with complete assurance that this position will be maintained, due to the secure, frictional engagement of coupling member 22 and locking rings/washers 23 and 24.

If desired, tabs 38 may be slanted or sloped relative to rim member 35 in order to enable the engagement of tubing/conduits 25 and 26 to be achieved more easily. Alternatively, if desired, rings/washers 23 and 24 may be constructed in a generally sloping or slanted configuration for achieving the same ease of entry of tubing/conduits 25 and 26 therethrough.

Regardless of which construction is employed, the use of a slanted or sloping configuration enables tubing/conduits 25 and 26 to enter through rings/washers 23 and 24 more easily, while enabling tabs 38 to frictionally engage the outer surface of tubing/conduits 25 and 26 thereby preventing the removal of tubing/conduits 25 and 26 from coupling member 22.

In FIGS. 6–9, two alternate embodiments for locking rings/washers 23 and 24 are fully detailed. As discussed above, since both locking rings/washers 23 and 24 comprise identical constructions, FIGS. 6–9 have been presented depicting only ring/washer 23 for exemplary purposes. However, it is to be understood that the intent of FIGS. 6–9 is to fully detail and represent the construction of both rings/washers 23 and 24.

In the embodiment of ring/washer 23 shown in FIGS. 6 and 7, ring/washer 23 comprises an overall circular shape defined by circular shaped rim member 35 which comprises an inner edge 37 having a diameter "D". In addition, in this embodiment, ring/washer 23 comprises a circular shape flange 42 extending from the outer edge of rim member 35 at substantially right angles thereto. In this way, flange 42 and rim member 35 effectively form an L-shaped configuration, with the overall diameter of ring/washer 23 comprising diameter "C".

In the preferred configuration, diameter "C" of ring/washer 23 is constructed to be slightly greater than inner diameter "B" of annular zones 31 and 32. As a result, when rings/washers 23 and 24 are mounted in annular zones 31 and 32, rings/washers 23 and 24 are mounted in secure, mating, locked, frictional engagement therein.

If desired, flange 42 may be sloped relative to rim member 35 so as to form an angle greater than 90° therewith. By employing this sloped configuration, secure, fully engaged, frictional inter-engagement between rings/washers 23 and 24 with coupling member 22 is enhanced.

As with the embodiment detailed above, this embodiment of ring/washer 23 also comprises a plurality of radially extending tabs 38, each of which extend inwardly from inner edge 37 of rim member 35. As depicted in FIGS. 6 and 7, radially extending tabs 38 are preferably spaced about inner edge 37, substantially equidistant from each other, with each tab 38 being diametrically opposed from another tab 38. In addition, each radially extending tab 38 incorporates terminating edge 39, with diametrically opposed edges 39 of each pair of facing tabs 38 defining diameter "E".

In this embodiment of the present invention, diameter "D" of ring/washer 23 is constructed to be greater than the outer diameter of tubing/conduits 25 and 26 with which ring/washer 23 is to cooperate. In this way, tubing/conduits 25 and 26 are able to freely pass through diameter "D" of ring/washer 23 without incurring any interference. However, diameter "E", which is established by edges 39 of facing tabs 38, is constructed to be less than the outside diameter of tubing/conduits 25 and 26. In this way, once tubing/conduits 25 and 26 have passed through ring/washer 23, radially extending tabs 38 frictionally engage the outer surface of tubing/conduits 25 and 26, preventing their removal or withdrawal therefrom.

In addition, in this embodiment, the length of each tab 38 is constructed to enable tubing/conduits 25 and 26 to be forceable through rings/washers 23 and 24, overcoming the interference fit created by diameter "E" of tabs 38. However, although tubing/conduits 25 and 26 can be forced through rings/washers 23 and 24, once fully engaged therein, removal of tubing/conduits 25 and 26 is incapable of being achieved, due to the secure frictional engagement between tabs 38 of rings/washers 23 and 24 in tubing/conduits 25 and 26. In addition, the secure frictional engagement of rings/washers 23 and 24 within annular zones 31 and 32 of coupling member 22 provides further assurance that tubing/conduits 25 and 26 are incapable of being removed from coupling member 22.

In FIGS. 8 and 9, a further alternate embodiment of rings/washers 23 and 24 is fully depicted, with ring/washer 23 being shown in these Figures for exemplary purposes. In this embodiment, ring/washer 23 is constructed in a manner substantially identical to the embodiment shown in FIGS. 6 and 7. However, as detailed below, a plurality of locking fingers are formed in flange 42, extending outwardly therefrom.

In this embodiment, as shown in FIGS. 8 and 9, ring/washer 23 comprises an overall circular shape defined by circular shaped rim member 35 which comprises an inner edge 37 having a diameter "D". In addition, ring/washer 23 comprises a circular shaped flange 42 extending from the outer edge of rim member 35 at substantially right angles thereto. In this way, flange 42 and rim member 35 effectively form an L-shaped configuration, with the overall diameter of ring/washer 23 comprising a diameter "C".

In the preferred configuration, diameter "C" of ring/washer 23 is constructed to be slightly greater than inner diameter "B" of annular zones 31 and 32. As a result, when rings/washers 23 and 24 are mounted in annular zones 31 and 32, rings/washers 23 and 24 are secured in mating, locked, fractional engagement therein.

In this embodiment, flange 42 incorporates a plurality of locking fingers 44 formed therein and equally spaced from each other. Preferably, fingers 44 are sloped relative to rim member 35 so as to form an angle greater than 90° therewith. By employing this sloped configuration, fingers 44 provide secure, fully engaged, frictional interengagement between rings/washers 23 and 24 and coupling member 22.

As with the embodiment detailed above, this embodiment of ring/washer 23 also comprises a plurality of radially extending tabs 38, each of which extend inwardly from inner edge 37 of rim member 35. As depicted in FIGS. 8 and 9, radially extending tabs 38 are preferably spaced about inner edge 37, substantially equidistant from each other, with each tab 38 being diametrically opposed from another tab 38. In addition, each radially extending tab 38 incorporates terminating edge 39, and diametrically opposed edges 39 of each pair of facing tabs 38 define diameter "E".

In the preferred construction of this embodiment of the present invention, diameter "D" of ring/washer 23 is constructed to be greater than the outer diameter of tubing/conduits 25 and 26 with which ring/washer 23 is to cooperate. In this way, tubing/conduits 25 and 26 are able to freely pass through diameter "D" of ring/washer 23 without incurring any interference. However, diameter "E", which is established by edges 39 of facing tabs 38, is constructed to be less than the outside diameter of tubing/conduits 25 and 26. In this way, once tubing/conduits 25 and 26 have passed through ring/washer 23, radially extending tabs 38 frictionally engage the outer surface of tubing/conduits 25 and 26, preventing their removal or withdrawal therefrom.

In addition, in this embodiment, the length of each tab 38 is constructed to enable tubing/conduits 25 and 26 to be forced through rings/washers 23 and 24, overcoming the interference fit created by diameter "E" of tabs 38. However, although tubing/conduits 25 and 26 can be forced through rings/washer 23 and 24, once fully engaged therein, removal of tubing/conduits 25 and 26 is incapable of being achieved, due to the secure, frictional engagement between tabs 38 of rings/washers 23 and 24 with tubing/conduits 25 and 26. In addition, the secure frictional engagement of rings/washers 23 and 24 with annular zones 31 and 32 of coupling member 22 provides further assurance that tubing/conduits 25 and 26 are incapable of being removed from coupling member 22.

In FIGS. 10–14, an alternate embodiment for conduit or tubing coupling assembly 20 is fully detailed. In this embodiment, coupling assembly 20 comprises a conduit/tubing coupling member 22 which is constructed in a manner substantially identical to the construction detailed above. In this regard, conduit/tubing coupling member 22 comprises a generally hollow, cylindrically shaped central section 30, which incorporates inside diameter "A" which extends substantially the entire length of central section 30.

In addition, central section 30 incorporates upstanding ridge 27 formed substantially midway along the length of central section 30. As previously discussed, ridge 27 is employed as an abutment stop for conduits 25 and 26 as they are advanced into coupling member 22.

Furthermore, conduit/tubing coupling member 22 comprises enlarged, terminating annular zones 31 and 32 forming the opposed ends of coupling member 22. As depicted, annular zones 31 and 32 each comprises internal diameter "B", which is greater than internal diameter "A".

Completing this embodiment of tubing/conduit coupling member 22, and distinguishing this embodiment from the previous embodiment detailed above, coupling member 22 incorporates a plurality of apertures 48 formed in annular zones 31 and 32. Preferably, apertures 48 comprise rectangular shapes and are spaced about annular zones 31 and 32 substantially equidistant from each other.

In FIGS. 12 and 13, the preferred construction of locking ring/washer 23 of this embodiment of coupling member 22 is detailed. As with the previous embodiments, FIGS. 12 and 13 depict only ring/washer 23 for exemplary purposes, with the intent that FIGS. 12 and 13 represent the construction of both rings/washers 23 and 24.

As shown in these Figures, this embodiment of ring/washer 23 comprises a circular shaped, flat plate member 50, having side edges 51 and 52. In addition, circular shaped plate member 50 comprises an outer diameter "C" and an inner diameter "D". In this embodiment, the difference between these diameters comprises the thickness of plate member 50.

Preferably, outer diameter "C" of this embodiment of ring/washer 23 is constructed to be substantially equal to or slightly greater than inner diameter "B" of annular zones 31 and 32. In this way, rings/washers 23 and 24 are capable of being mounted in annular zones 31 and 32 quickly and easily, with some frictional engagement being provided. However, as fully detailed below, secure, locked interengagement is enhanced and preferably established by incorporating alternate locking members.

In order to provide the desired secure, locked interengagement of this embodiment of ring/washer 23 with annular zones 31 and 32, a plurality of locking fins 55 are mounted to edge 52 of plate member 50, radially extending outwardly therefrom. In the preferred configuration, fins 55 comprise a generally rectangular shaped constructed for mating, engagement in apertures 48 of annular zones 31 and 32. In this regard, fins 55 are positioned about plate member 50 in juxtaposed, spaced relationship corresponding to the spacing employed for forming apertures 48 in annular zones 31 and 32.

The construction of this embodiment of ring/washer 23 is completed by incorporating a plurality of radially extending tabs 38, each of which extend inwardly from edge 51 of plate member 50. Each radially extending tab 38 incorporates a terminating edge 39 which cooperates with each other to form a diameter "E", which is smaller than diameter "D" of plate member 50.

As with the previous embodiment detailed above, diameter "D" of ring/washer 23 is constructed to be greater than the outer diameter of tubing/conduits 25 and 26 with which ring/washer 23 is to cooperate. In this way, tubing/conduits 25 and 26 are able to freely pass through diameter "D" of ring/washer 23 without incurring any interference. However, diameter "F" is constructed to be less than the outside diameter of tubing/conduits 25 and 26. As a result, once tubing/conduits 25 and 26 are passed through ring/washer 23, radially extending tabs 38 frictionally engage the outer surface of tubing/conduits 25 and 26, preventing their removal or withdrawal therefrom.

Figure 14:
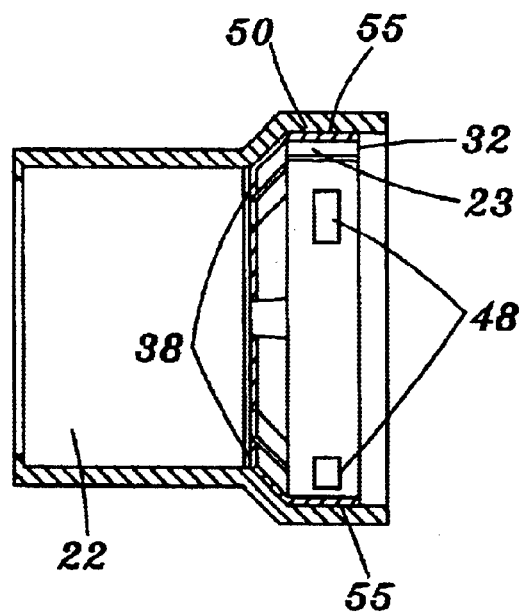
FIG. 14 is a cross-sectional side elevation view, partially broken away, depicting the locking ring/washer of FIGS. 12 and 13 mounted in position with the coupling member of FIG. 10.

In addition, as shown in FIG. 14, this embodiment of ring/washer 23 is securely locked with coupling member 22 by the engagement of locking fins 55 in apertures 48 of annular zones 31 and 32. By employing this construction, secure, locked engagement of rings/washers 23 and 24 is assured, along with the secure, mounted engagement of tubing/conduits 25 and 26 once inserted therewith.

Figure 15:
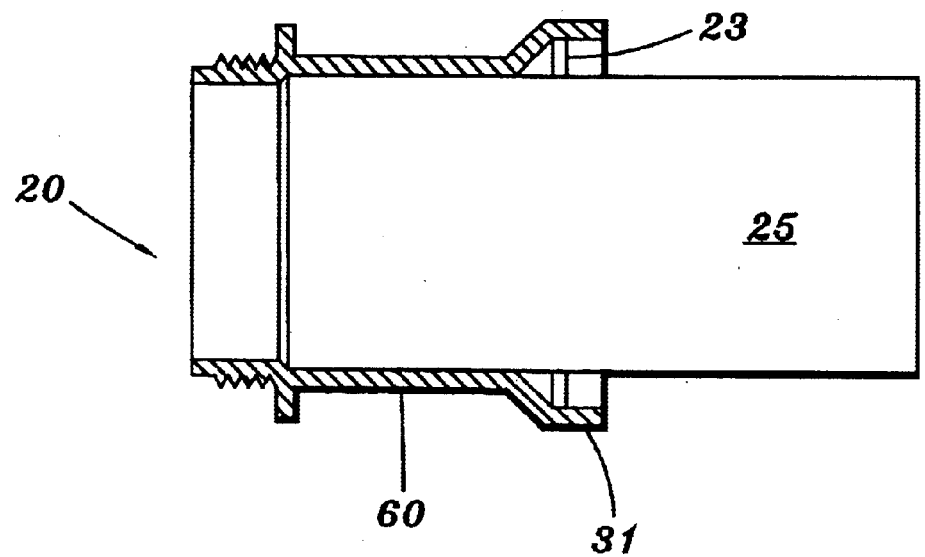
FIG. 15 is a cross-sectional side elevation view of the tubing or conduit connector assembly of the present invention shown engaged with one pipe or conduit.

Finally, in FIG. 15, conduit or tubing coupling/connector assembly 20 is depicted as comprising conduit or pipe connector member 60 incorporating a flat, locking ring or washer 23, as depicted in FIGS. 4 and 5, mounted therein. In addition, conduit/connector assembly 20 is shown securely locking and holding conduit or tubing 25 securely mounted to connector member 60.

As discussed above, connector 60 is employed to secure a single-conduit or tubing 25 to a junction box or electrical housing. Although interconnecting to conduits or tubing together is most often used, connector members 60 are also common in the industry.

Furthermore, in FIG. 15, conduit/tubing 25 is securely mounted to connector member 60 by employing locking ring or washer 23 of FIGS. 4 and 5. However, as is evident from the foregoing detailed disclosure, any of the alternate embodiments for locking ring/washer 23 detailed herein can be employed with equal efficacy.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Having described my invention, what I claim as new and desire to secure by Letters Patent is:

1. A conduit coupling and connector assembly for securely affixing at least one conduit in a desired position, said conduit coupling and connector assembly comprising:

A. a housing comprising a substantially elongated, generally cylindrical portion comprising a. a first, hollow, cylindrically shaped conduit receiving section comprising an inside diameter constructed for telescopically receiving a desired conduit therein, and b. a first, enlarged annular flange portion formed at a first end of the first conduit receiving section and comprising an inside diameter substantially greater than the inside diameter of the conduit receiving section;

B. a first locking ring or washer mounted in the first annular flange portion of the housing, and comprising a. a body member formed in a flat, circular-shape with said entire body member lying in a single plane and comprising an inside edge defined by an inside diameter and an outside edge defined by an outside diameter, with the flat, planar body member extending between the inside edge and the outside edge formed in a single plane therewith, b. the inside diameter defined by the inside edge being greater than the outside diameter of the conduit being mounted, c. a plurality of fins,
(1) radially extending inwardly from the inside edge and lying in the same plane as the body member,
(2) positioned in juxtaposed, diametric, facing relationship with each other, and
(3) defining therebetween a diameter which is less than the diameter of the conduit, and d. the outside diameter defined by the outside edge being greater than the inside diameter of the annular flange portion whereby said locking ring/washer is securely, non-removably retained in said annular flange portion by the frictional engagement between the ring/washer and the inside surface of the annular flange portion.

2. The conduit coupling and connector assembly defined in claim 1, wherein the radially extending fins of the ring/washer are constructed for securely engaging the outer surface of the conduit for preventing axial removal or dislodgement of the conduit from the housing after telescopic insertion therein.

3. The conduit coupling and connector assembly defined in claim 2, wherein said ring/washer is formed from thin, metal material for providing limited arcuate flexing relative to the annular flange portion for enabling the conduit to be inserted therethrough and into the conduit receiving section of the housing, while still preventing axial removal of the conduit after insertion.

4. The conduit coupling and connector assembly defined in claim 1, wherein said housing comprises c. a second, hollow, cylindrically shaped conduit receiving section integrally connected to the second end of the first conduit receiving section, co-axially aligned with the first conduit receiving section and comprising an inside diameter constructed for telescopically receiving a desired conduit therein, and d. a second, enlarged annular flange portion formed at the first end of the second conduit receiving section and comprising an inside diameter substantially greater than the inside diameter of the conduit receiving section.

5. The conduit coupling and connector assembly defined in claim 4, wherein said assembly comprises a second locking ring or washer mounted in the second annular flange portion.

6. The conduit coupling and connector assembly defined in claim 5, wherein the second locking ring or washer comprises A. a body member formed in a thin, flat circular-shape with said entire body member lying in a single plane and comprising an inside edge defined by an inside diameter and an outside edge defined by an outside diameter, with the flat, planar body member extending between the inside edge and the outside edge, formed in a single plane therewith, B. the inside diameter defined by the inside edge being greater than the outside diameter of the conduit being mounted, C. a plurality of fins,
  a. radially extending inwardly from the edge and lying in the same plane as the body member,
  b. positioned in juxtaposed, diametric, facing relationship with each other, and
  c. defining therebetween a diameter which is less than the diameter of the conduit, and D. the outside diameter defined by the outside edge being greater than the inside diameter of the second annular flange portion whereby said second locking ring/washer is securely, non-removably retained in said second annular flange portion by the frictional engagement between the second ring/washer and the inside surface of the second annular flange portion.

7. The conduit coupling and connector assembly defined in claim 6, wherein the first locking ring/washer and the second locking ring/washer comprise a plurality of fingers radially extending outwardly from the body member and constructed for locking engagement with the annular flange portion of the housing.

8. The conduit coupling and connector assembly defined in claim 1, wherein said housing comprises a plurality of slotted apertures formed in the annular flange portion and extending through the annular flange portion, and said first locking ring/washer comprises a plurality of tabs constructed for engagement within the slotted apertures, said tabs radially extending outwardly from the outer edge of the body member and lying in the same plane as the body member forming the ring/washer.

9. The conduit coupling and connector assembly defined in claim 8, wherein said first locking ring/washer comprises a flat, planar, circular shaped plate containing tabs radially extending inwardly.

10. A conduit coupling and connector assembly for securely affixing at least one conduit in a desired position, said conduit coupling and connector assembly comprising:

A. a housing comprising a substantially elongated, generally cylindrical portion comprising
  a. a first, hollow, cylindrically shaped conduit receiving section comprising an inside diameter constructed for telescopically receiving a desired conduit therein,
  b. a first, enlarged annular flange portion formed at a first end of the first conduit receiving section and comprising an inside diameter substantially greater than the inside diameter of the conduit receiving section, and
  c. a plurality of slotted apertures formed in the first annular flange portion in spaced, peripheral, surrounding relationship therein, with the slotted apertures extending through the annular flange portion;

B. a first locking ring or washer mounted in the first annular flange portion of the housing, and comprising
  a. a body member formed in a flat, circular-shape with said entire body member lying in a single plane and comprising an inside diameter and an outside edge defined by an outside diameter, with the flat, planar body member extending between the inside edge and the outside edge, formed in a single plane therewith;
  b. the inside diameter defined by the inside edge being greater than the outside diameter of the conduit being mounted,
  c. a plurality of fins,
    (1) radially extending inwardly from the inside edge and lying in the same plane as the body member,
    (2) positioned in juxtaposed, diametric, facing relationship with each other, and
    (3) defining therebetween a diameter which is less than the diameter of the conduit,
  d. the outside diameter defined by the outside edge being substantially equal to or greater than the inside diameter of the annular flange portion, and
  e. a plurality of fins
    (1) radially extending outwardly from the outside edge and lying in the same plane as the body member, and
    (2) positioned for secure locking engagement in the slotted apertures formed in the annular flange portion;

whereby said locking ring/washer is securely, non-removably retained in said annular flange portion by the engagement between the outwardly extending fins of ring/washer in the slotted apertures of the annular flange portion.

11. The conduit coupling and connector assembly defined in claim 10, wherein the inwardly extending fins of the ring/washer are constructed for securely engaging the outer surface of the conduit for preventing axial removal or dislodgement of the conduit from the housing after telescopic insertion therein.

12. The conduit coupling and connector assembly defined in claim 10, wherein said ring/washer is formed in a substantially circular shape having a width greater than its thickness with the outwardly extending tabs formed on an outer surface thereof and the inwardly extending tabs formed on an inside surface thereof.

13. The conduit coupling and connector assembly defined in claim 10, wherein said housing comprises four slotted apertures formed in substantially equal spaced intervals and the ring/washer comprises four outwardly extending tabs formed for engagement in said slotted apertures.

14. A conduit coupling and connector assembly for securely affixing at least one conduit in a desired position, said conduit coupling and connector assembly comprising:

A. a housing comprising a substantially elongated, generally cylindrical portion comprising
  a. a hollow, cylindrically shaped conduit receiving section comprising an inside diameter constructed for telescopically receiving two cooperating conduits thereof;
  b. a first, enlarged annular flange portion formed at a first end of the conduit receiving section and comprising an inside diameter substantially greater than the inside diameter of the conduit receiving section;
  c. a second, enlarged annular flange portion formed at a second end of the conduit receiving section and comprising an inside diameter substantially greater than the inside diameter of the conduit receiving section; and
  d. a plurality of slotted apertures formed in the first annular flange portion and the second annular flange portion, in peripheral, surrounding relationship therewith;

B. a pair of locking rings or washers having a substantially flat, circular-shape, individually mounted in the first and the second annular flange portions of the housing, each of said ring/washers comprising
a. a body member formed in a flat, circular-shape with said entire body member lying in a single plane and comprising an inside diameter and an outside edge defined by an outside diameter, with the flat, planar body member extending between the inside edge and the outside edge, formed in a single plane therewith;
b. the inside diameter defined by the inside edge being greater than the outside diameter of the conduit being mounted,
c. a plurality of fins, radially extending inwardly from the inside diameter, positioned in juxtaposed, diametric, facing relationship with each other and defining therebetween a diameter which is less than the diameter of the conduit,
d. the outside diameter defined by the outside edge being substantially equal or greater than the inside diameter of the annular flange portion, and
e. a plurality of fins
 1. radially extending outwardly from the outside edge and lying in the same plane as the body member, and
 2. positioned for secure locking engagement in the slotted apertures formed in the annular flange portion;

whereby one locking ring/washer is securely, non-removably retained in each of said annular flange portions by the engagement between the outwardly extending fins of the ring/washer in the slotted apertures of the annular flange portion.

* * * * *